(12) United States Patent
Bloomberg et al.

(10) Patent No.: US 6,952,803 B1
(45) Date of Patent: Oct. 4, 2005

(54) METHOD AND SYSTEM FOR TRANSCRIBING AND EDITING USING A STRUCTURED FREEFORM EDITOR

(75) Inventors: Dan S. Bloomberg, Palo Alto, CA (US); Thomas P. Moran, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 535 days.

(21) Appl. No.: 09/222,209

(22) Filed: Dec. 29, 1998

(51) Int. Cl.[7] .............................................. G06F 15/00
(52) U.S. Cl. ..................... 715/530; 715/541; 715/531; 715/863; 382/186; 382/187
(58) Field of Search ................... 707/530, 531, 707/536, 539, 540, 541; 382/186, 198, 199, 189; 715/530, 531, 536, 539, 540, 541

(56) References Cited

U.S. PATENT DOCUMENTS

| | | | |
|---|---|---|---|
| 5,025,314 A | | 6/1991 | Tang et al. .............. 348/14.08 |
| 5,072,412 A | | 12/1991 | Henderson, Jr. et al. .... 345/804 |
| 5,438,630 A | * | 8/1995 | Chen et al. ................ 382/159 |
| 5,448,263 A | | 9/1995 | Martin ....................... 345/173 |
| 5,454,046 A | * | 9/1995 | Carman, II ................ 382/186 |
| 5,500,937 A | * | 3/1996 | Thompson-Rohrlich .... 345/173 |
| 5,550,931 A | * | 8/1996 | Bellegarda et al. ......... 382/187 |
| 5,655,136 A | * | 8/1997 | Morgan ..................... 345/179 |
| 5,717,869 A | | 2/1998 | Moran et al. .............. 345/716 |
| 5,717,879 A | | 2/1998 | Moran et al. .............. 345/716 |
| 5,778,404 A | * | 7/1998 | Capps et al. ............... 707/531 |
| 5,781,662 A | * | 7/1998 | Mori et al. ................ 382/189 |
| 5,784,061 A | * | 7/1998 | Moran et al. .............. 345/358 |
| 5,786,814 A | | 7/1998 | Moran et al. .............. 345/720 |
| 5,818,963 A | * | 10/1998 | Murdock et al. .......... 382/187 |
| 5,861,886 A | * | 1/1999 | Moran et al. .............. 345/358 |
| 5,880,743 A | * | 3/1999 | Moran et al. .............. 345/473 |
| 6,018,346 A | * | 1/2000 | Moran et al. .............. 345/358 |
| 6,108,444 A | * | 8/2000 | Syeda-Mahmood ........ 382/186 |
| 6,175,844 B1 | * | 1/2001 | Stolin ........................ 707/521 |
| 6,230,170 B1 | * | 5/2001 | Zellweger et al. ......... 707/512 |

OTHER PUBLICATIONS

Thomas P. Moran et al., "Implicit Structures for Pen–Based Systems Within a Freeform Interaction Paradigm", *CHI'95*, pp. 1–8 (Dec. 16, 1994).

* cited by examiner

*Primary Examiner*—Stephen Hong
*Assistant Examiner*—Thu V. Huynh
(74) *Attorney, Agent, or Firm*—Fay, Sharpe, Fagan, Minnich & McKee, LLP

(57) ABSTRACT

A system and method for editing and transcribing using a structured freeform editor is provided. The method implemented in the system includes interpreting structure of freeform graphic elements and selectively editing the structure and/or selectively transcribing scribble elements to an editable format.

6 Claims, 5 Drawing Sheets

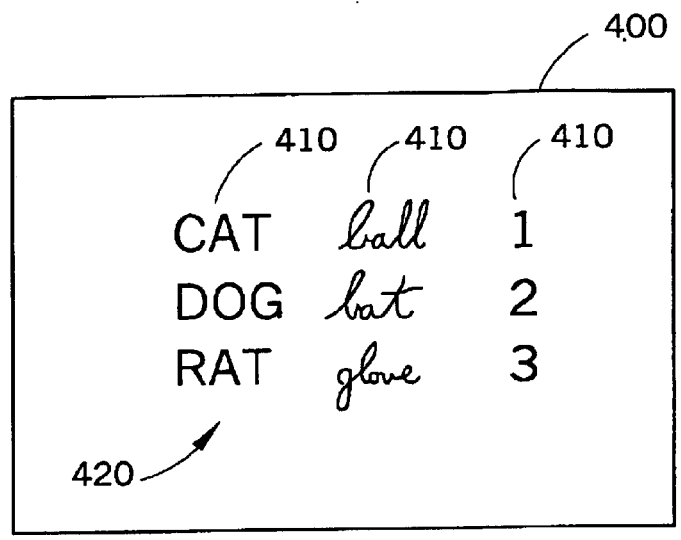
FIG. 7
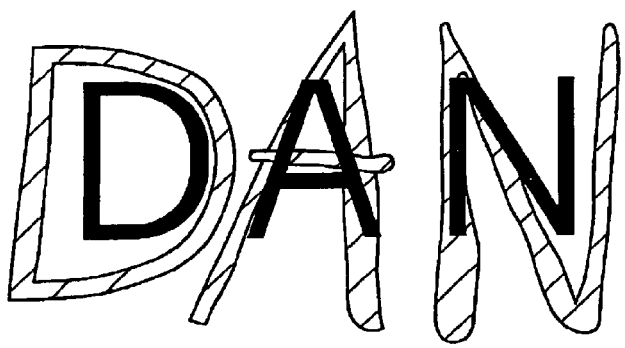
FIG. 8
DAN
FIG. 9

METHOD AND SYSTEM FOR TRANSCRIBING AND EDITING USING A STRUCTURED FREEFORM EDITOR

CROSS-REFERENCE TO RELATED APPLICATIONS

This application is related to the following commonly assigned U.S. patent applications: U.S. Ser. No. 08/736,883, filed Oct. 25, 1996, entitled "Apparatus and Method for Supporting the Implicit Structure of Freeform Lists, Outlines, Text, Tables, and Diagrams in a Gesture Based Input System and Editing System" by Moran et al. and U.S. Ser. No. 08/976,907, filed Nov. 24, 1997, entitled "Apparatus and Method for Animating Interactive Editing Operations" by Moran et al. These applications are, in their entirety, each specifically incorporated herein by reference.

NOTICE

A portion of the disclosure of this patent document contains material which is subject to copyright protection. The copyright owner has no objection to the facsilile reproduction by anyone of the patent document or the patent disclosure, as it appears in the Patent and Trademark Office patent file or records, but otherwise reserves all copyright rights whatsoever.

BACKGROUND OF THE INVENTION

This invention relates to a system and method for transcribing and editing freeform image data using a structured freeform editor. More particularly, the invention is directed to a system and method for transcribing and editing freeform graphic elements (FGE(s)) such as scribbles and other graphical objects associated with scribble input devices (such as interactive display boards), scanned images, graphic programs, pen-based ink formats and raster-converted graphics. The subject editor can be used for both transcription from freeform graphic elements (such as scribble) to an editable text format and for editing of the interpreted structure of the freeform graphic elements. The editor performs basic functions that appear to the user to be simple. However, the output of the editor is important because it may then be integrated with other high end editors for situations where greater control of the output format is required.

While the invention is particularly directed to the art of transcribing and editing data representing freeform graphic elements such as scribbles, text and other graphical objects displayed on a scribble device or otherwise input into the system, and will thus be described with specific reference thereto, it will be appreciated that the invention may have usefulness in other fields and applications.

By way of background, it is generally accepted that the construction of textual matter is important for most computer applications. In the early development of computers, only plain-text editors were implemented on large computers. These editors included basic functions such as line formatting, tabbing, capitalization, etc. and other functions typically available on typewriters. Soon after the introduction of the low-cost laser printer by Apple in 1984, however, a new type of text and graphic application programs emerged, referred to here as "structured editors", which dealt with text format and layout, document structures, page layout, and graphic diagrams. Examples of such structured editors include Microsoft Word (for text documents), Adobe PageMill (for internet web pages), Microsoft Excel (for spreadsheets), and Visio (for diagrams and charts).

The plain-text editors, initially line-oriented in the 1960s and early 1970s, became increasingly screen oriented in the late 1970s and early 1980s. They had one purpose: put text, essentially unformatted and with no concept of typography, into buffers with the least amount of effort. Examples of screen-oriented plain-text editors are vi and emacs. The appeal of such an editor is simplicity. A small amount of structure, such as auto-indent, is easily imposed, and these simple editors can be embedded in other applications.

In office situations, plain-text editors are rarely used outside of e-mail applications. Most office documents require at least some structure, such as memos and letters, and the structured editors handle these applications very well. Yet, the plain-text editors survive because of their simplicity and the usefulness of creating text with minimal layout structure.

However, there are situations where neither plain-text editors nor structured editors are suitable. These are situations where notes need to be taken quickly and/or where greater flexibility in creating and manipulating information is needed.

Examples of such situations are:

(1) Taking notes on a board in front of a meeting. This might be on a physical whiteboard, where everyone can see what's written. This might also take place on a large pen-based electronic display, such as a LiveBoard or a SmartBoard.

(2) Taking notes on a "blank sheet", either in a meeting or working alone. The notes might be taken on paper with a pen or pencil. They might be taken on a pen-based electronic device. They might be taken on a laptop with a plain-text editor.

(3) Making notes on an existing document, either in a meeting or working alone. This might be done on paper with pencil or pen, or it could be done on an electronic device that can display a document and allow annotations to be made on the displayed document.

In these situations, a new kind of editor is preferred, which we call a "freeform editor". A freeform editor allows "freeform graphic elements" (FGE(s)) to be freely created and moved around on a two-dimensional surface. By contrast, a plain-text editor is not freeform, because text cannot be put anywhere (such as in the margins or on top of other text). The most common kind of freeform editors are pen-based drawing programs that allows "digital ink" strokes to be created, thus simulating a whiteboard or notebook, which we call "scribble editors". The FGE(s) of a scribble editor are the strokes. Other kinds of drawing systems that allow FGE(s) (such as pictures, icons, or test objects) to be moved around in an unconstrained way are also instances of freeform editors.

There are several useful things to be done with the freeform material (i.e. the FGE(s)) of a freeform editor.

(1) It would be useful to be able to structure the FGE(s). For example, the strokes in a scribble editor might want to be structured into words, lines of words, items in a list, groups of words as cells in a table, etc. An editor that allows such structuring of the FGE(s) is called a "structured freeform editor" (SFE). The capability that distinguishes a SFE from normal structured editors is that the user can freely move FGE(s) in a SFE, and the editor automatically recognizes the structures and preserves the structural relations as editing operations take place. An example of a SFE is the MeetingBoard program for the LiveBoard (a product of LiveWorks Inc., a former Xerox company).

(2) Another useful operation on freeform material would be to be able to transcribe non-textual FGE(s) into text, so that many textural operations such as searching and indexing may take place. In this regard, it would be desirable for transcription to be done automatically by handwriting recognition algorithms or manually by the user inputting the transcription or a mixture of both automatic and manual techniques.

(3) Finally, it would be useful to format freeform material (the FGE(s), their structure, and their transcriptions) to be input to a regular structured editor. For example, the scribbles made on a LiveBoard might be structured into a table structure and then formatted to be input into a Microsoft Word table.

The present invention proposes a new kind of structure freeform editor that allows freeform material to be imported from freeform editors or from scanned or photographic images, structured and restructured, manipulated and edited, new material to be created, transcribed, and exported in formats to be input into structured editors.

SUMMARY OF THE INVENTION

A method and system for use with devices that store freeform data, in the form of freeform graphic elements, representing such data as digital ink strokes, text fragments, structured graphic objects, digital images, are provided. The method and system support transcribing and editing functions through use of a structured freeform editor.

In one aspect of the invention, the method implemented in the system comprises obtaining the freeform data, segmenting the data into freeform graphic elements, interpreting the structure of the freeform graphic elements, and selectively navigating through the structure to transcribe the freeform graphic elements into an editable text format.

In another aspect of the invention, the method implemented in the system comprises obtaining the freeform data, segmenting the data into freeform graphic elements, interpreting the structure of the freeform graphic elements, and selectively editing the structure by using surrogate elements.

In another aspect of the invention, the method implemented in the system comprises obtaining the freeform data, segmenting the data into freeform graphic elements, interpreting the structure of the freeform graphic elements, selectively editing the structure, and selectively navigating through the structure to transcribe the scribble elements to convert the scribble elements to an editable text format.

In another aspect of the invention, the selective editing of the structure includes the use of surrogate elements.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device and steps of the method, whereby the objects contemplated are attained as hereinafter more fully set forth, specifically pointed out in the claims, and illustrated in the accompanying drawings in which:

FIG. 7 is an illustration of a display that is manipulated through implementation of the present invention;

FIG. 8 shows a transcription mode according to the present invention; and,

FIG. 9 shows another transcription mode according to the present invention.

DETAILED DESCRIPTION OF THE PREFERRED EMBODIMENTS

The structured freeform editing system and method described herein achieves certain advantages over prior known editing systems by allowing digital ink, scanned images, and other kinds of representations to be imported, manipulated and edited, structured, transcribed into text format, and exported for handling by structured editing systems. When exported, the data of interest is in a format such as, for example, Word, HTML, SGML, etc., as those of skill in the art will appreciate.

Figure 1:
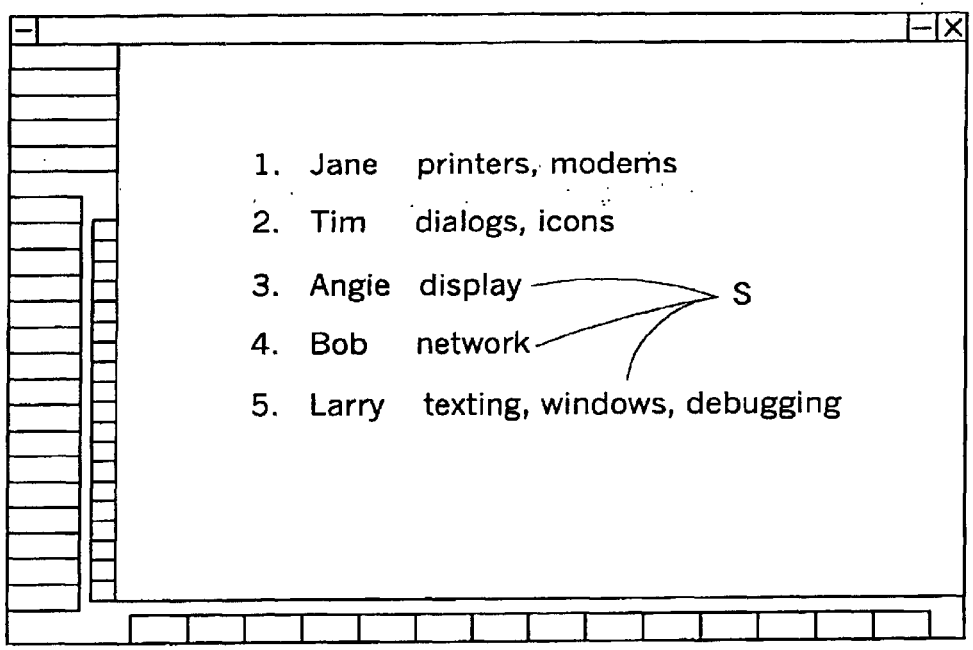
FIG. 1 illustrates an exemplary display screen of the type for displaying data manipulated through use of the present invention.

Because of its ability to handle both freeform and structured data, the editor used in the present system and method is referred to as a "structured freeform editor" (SFE). An example of an editor to which the present invention may be applied is the current version the software program described in connection with the above referenced patent applications that are incorporated by reference. That software program is known as "MeetingBoard" and supports the input and editing of freeform graphic elements such as the handwritten strokes in items 3–5, as well as the text in items 1 and 2, as shown in FIG. 1. It also recognizes, upon demand, the implicit structure in the freeform graphic elements and allows the user to edit the material according to the conventions of the recognized structure. The MeetingBoard program also treats text as either freeform graphic elements or as structured elements (strings, lists, etc.). Text and freeform graphic elements can be intermixed as shown in FIG. 1. The present invention extends these features to support the conversion of freeform graphic elements such as scribbles to text and support the editing of structures using surrogate structured elements.

The following are examples of the implicit structure noted above and applied in the present invention:

lists (vertically aligned sequences of items, which are horizontally clustered sets of graphical objects), text (horizontally aligned sequences of graphic objects), tables (arrays of elements, which are clustered graphical objects, aligned both horizontally and vertically), outlines (lists with indented items), and node-link diagrams.

What is meant by structure in a SFE is a pattern of spatial relationships among the FGE(s). The relationships we find most useful are: geometric alignment (usually horizontal or vertical), geometric grouping or clustering, and symbolic linking. The symbolic linking relationship is expressed in two ways: the first way is by a line (the "link") joining the material that is related by the link, and the second way is by a symbol indicating the related materials (a simple example is the use of numbers to symbolically relate text to footnotes). A particular pattern of spatial relationships can be a template for a particular structure. For example, a table consists of elements arrayed by vertical and horizontal alignments. The structure, or template, defines an interpretation of the underlying geometric structure of the data that can be used, as will be described herein, to facilitate transcription and editing.

Figure 2:
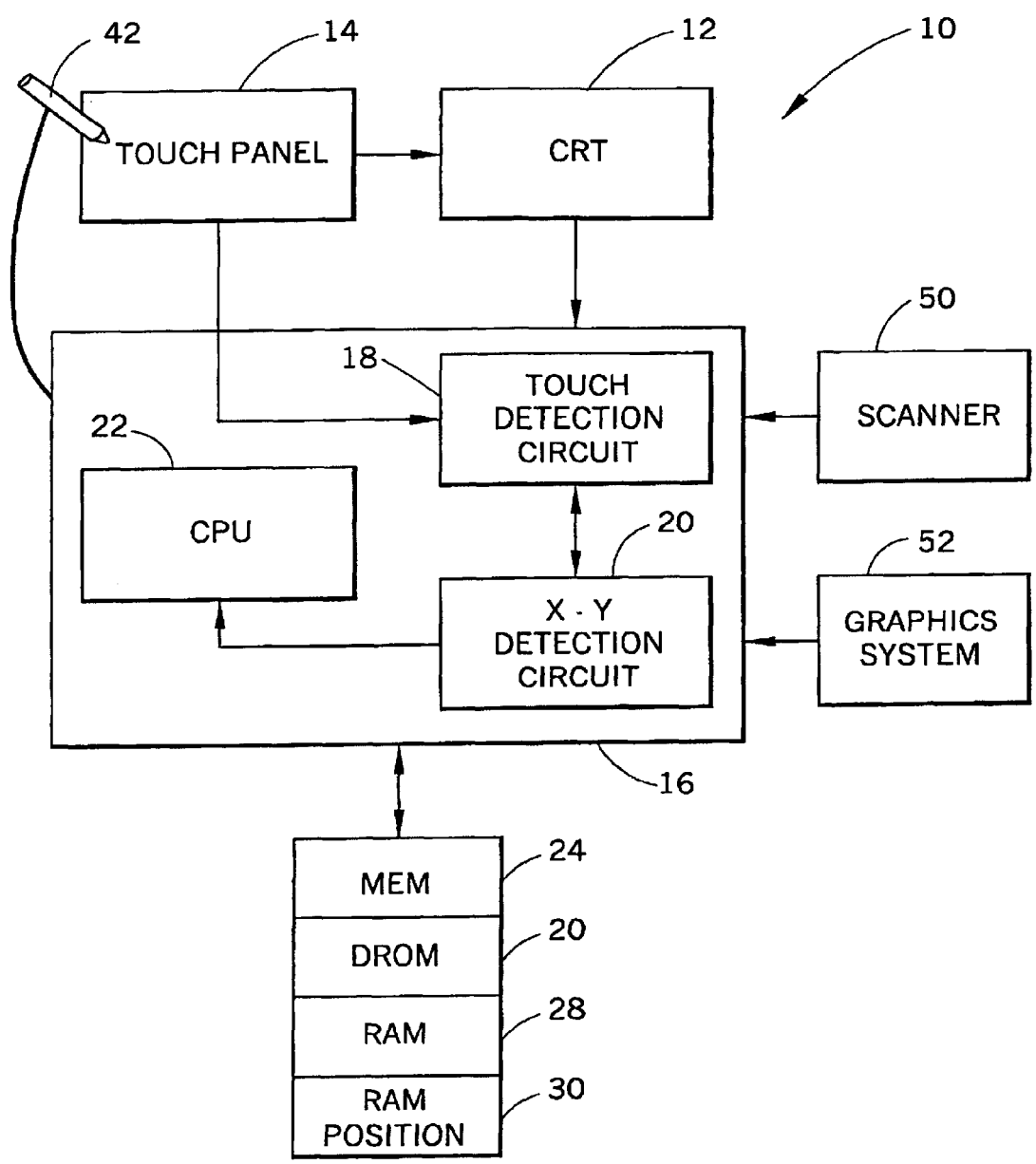
FIG. 2 is a block diagram illustrating one form of an input apparatus in which the system according to the present invention can be employed.

Referring now to the remaining drawings wherein the showings are provided for purposes of further illustrating the preferred embodiments of the invention only and not for purposes of limiting same, FIG. 2 shows a block diagram of the gesture based input system 10 including a CRT display 12. A transparent pressure sensitive type drawing surface 14, i.e., touch panel, is attached onto the surface of CRT display 12. Drawing surface 14 is touched by a user and the touch is detected by touch detection circuit 18.

The detected signal from touch detection circuit 18 is input to an X-Y detection circuit 20. X-Y detection circuit 20 processes the input signal and performs an arithmetic operation or the like. Thus, the X-Y detection circuit 20 detects the (x, y) coordinates of the input point touched on the surface of drawing surface 14 and transmits such information to CPU 22. Touch panel detection circuit 18, X-Y detection circuit 20 and the CPU 22 combine to form controller 16. Controller 16 performs the control in accordance with the control program stored in program ROM 26 in memory 24. ROM section in memory 24 includes program ROM 26 in which the control program of CPU 22 is stored and pattern data area to store various kinds of character patterns or the like. Likewise, the software implementation of the present invention (particularly, pertinent portions of the method of FIG. 4) is suitably stored in the ROM 26. RAM section 28 of memory 24 includes a RAM portion which is used as a work area of CPU 22 and a character position data area 30 to store display positions of character patterns and the like.

In addition, freeform graphic elements such as scribble data and data representing other graphical objects may be input by a variety of devices other than a touch panel. For example, such data may be obtained by the system through the use of a scanner 50 or a graphics system 52 that provides graphic images. Raster converted graphics may also be input to the system.

Figure 3:
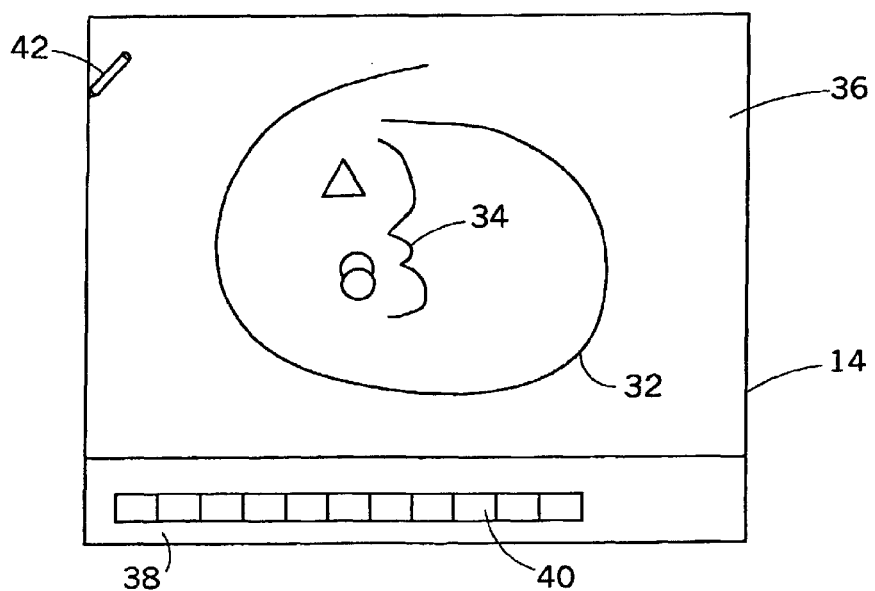
FIG. 3 is an elevational view of an exemplary display screen of the type associated with the apparatus of FIG. 2.

In FIG. 3, drawing surface 14 is an electronic input device such as an electronic sketch pad, an electronic interactive display or a whiteboard which employs a working surface and may employ a plurality of accessible functions 40, as is shown. The working surface is the upper area 36 of drawing surface 14 and the accessible functions 40 are positioned at the bottom area 38 of drawing surface 14. These functions 40 may include new operation (draw mode), delete, move, shrink and so on. Alternatively, these functions can be accessed by a pop-up menu. These functions however are optional in designation, their principal objects being to define operations which are inherent in the operation of the system. These functions may share some of the same functions that are represented by many designated command gestures.

A suitable user manipulable control or interacting device such as a stylus or light pen or the like 42 is employed to draw input symbols, select functions or draw gestures representative of specified functions. Obviously, other variants within the skill of the art may be employed.

Figure 4:
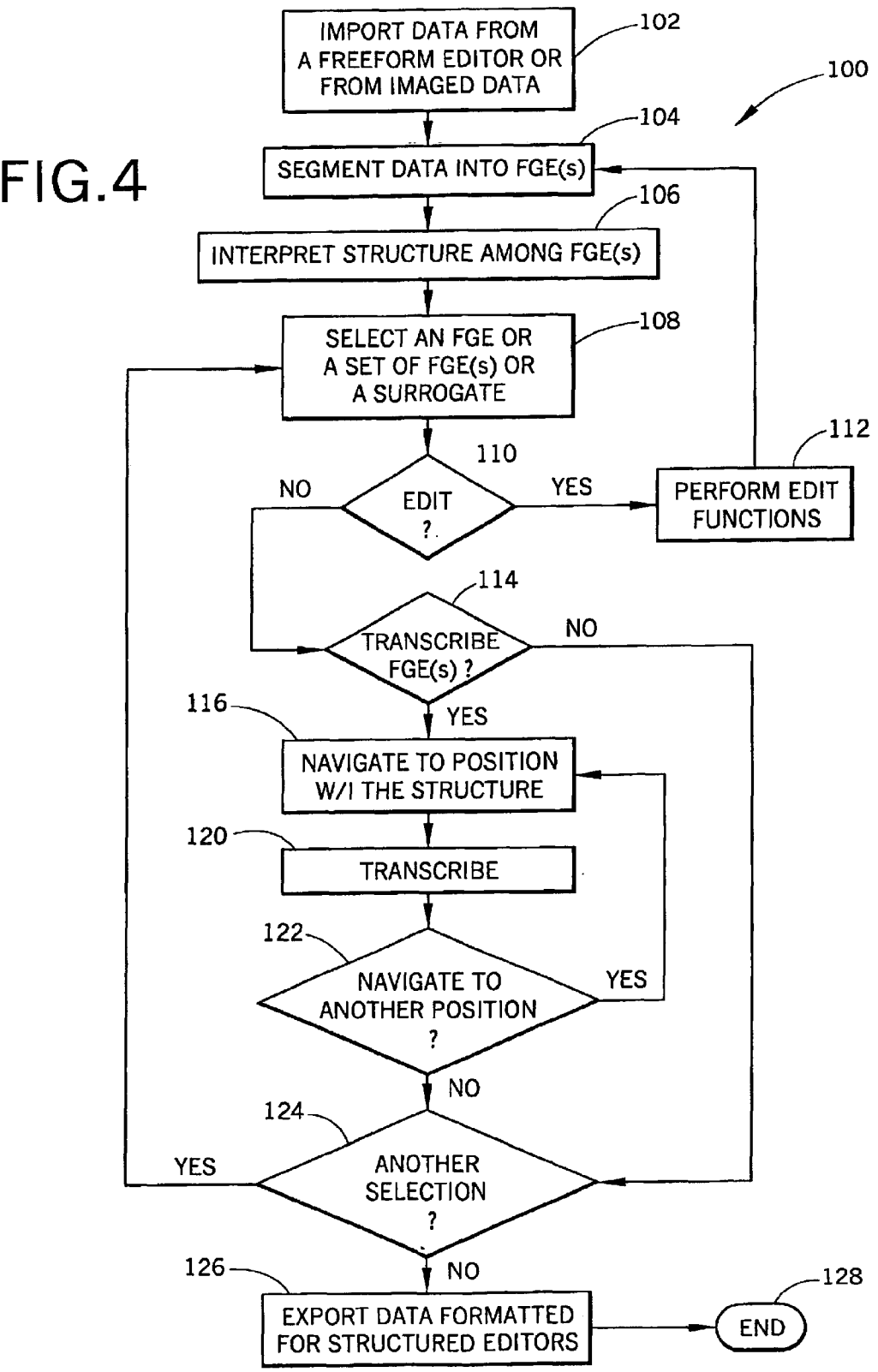
FIG. 4 is a flowchart illustrating the method according to the present application.

Referring now to FIG. 4, a method 100 for editing and transcribing according to the present invention is illustrated. It will be appreciated by those of skill in the art that this method may be implemented using known software techniques. Hardware may also be implemented where appropriate and/or necessary.

First, freeform data is imported from a freeform editor such as a scribble device or other apparatus for capturing imaged data (step 102). In some cases, the data may already be available within the system. In the case where the data is input from another device, such as a digital ink representation from a pen-based tablet device, it should be appreciated that the system will be able to adapt to the form of input so long as a pixel map (binary, grayscale, or color) is provided. If other information, such as information that may be provided by PDL or OCR devices, is available, the system will accommodate and may well use this additional information. That is, at a minimum, the image imported must be in the form of a pixel map to be effectively manipulated according to the present invention.

The data is then segmented into freeform graphic elements (FGE(s)) (step 104). Structure among the FGE(s) is then interpreted or recognized (step 106). It is important that the pattern of alignments, groupings, and symbolic links be recognized so that a template, or structure, can be appropriately recognized.

Interpreting or recognizing structure of the data may be accomplished in a variety of ways. A typical procedure is one for grouping lines. A related procedure determines baselines. (As used herein, a baseline is a line on which the bottom of all characters except for descenders, such as the left leg of the letter "p", lie.) Fundamental to both of these procedures is determining the density of the "ink" in the horizontal cross-sections of the screen. A top-down description of these procedures is provided below and pertinent portions of these procedures are set forth in Appendix A.

Given a point, the Line Grouping procedure finds the strokes that belong to the line of objects containing the y-coordinate of the given point. The procedure computes the top and bottom boundaries of the line and then tests all the strokes on the screen, collecting those that "reside" on the line. The criterion for a stroke residing on a line is that more than half of the vertical extent of the stroke must lie between the top and bottom line boundaries. Where the input is scanned text, rather than scribble strokes, several line grouping methods are available. A simple method is to deskew the image, use projection profiles to determine the range of y-coordinates for each text line, and then place connected components (typically, single characters of text) falling within such a range of y-coordinate values into the appropriate line. Components within a line are then sorted from left to right, after which they can be grouped into words based on their x-coordinate values.

The procedure Find Line Boundaries in Appendix A is based on the ink density function. This density is represented discretely by an array. The screen is partitioned into horizontal strips and the "density of the ink" is computed for each strip. This array of values is then converted to binary values (0 or 1) by applying a threshold of ink density in order to achieve the value "1". The threshold is expressed as a fraction of the average density. By employing smaller or larger thresholds, the ink density can be used to find line boundaries or text baselines. Other, more sophisticated procedures could also be used to determine line boundaries (e.g., steps that can deal with skewed lines).

Figure 5:
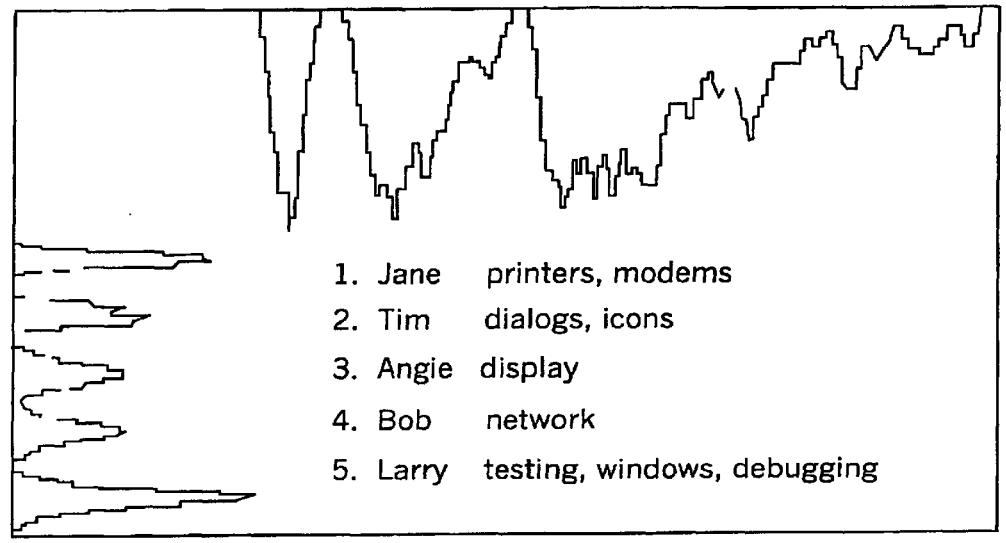
FIG. 5 is an illustration of the projected ink profile of the display of FIG. 1.

To illustrate, FIG. 5 shows graphically the profile computed in both horizontal and vertical dimensions for the material from FIG. 1. The projected ink profile graphs at the left and top show the system measure of ink density in the x and y directions. The peaks and valleys of the profile curves are analyzed to identify the structural elements and the spaces between them. While more sophisticated clustering techniques could also be used, this computational technique is suitable. It effectively detects alignment relations that are inherent in list-like structures, while tolerating some degree of overlap between elements (e.g., the strokes in items 3 and 4 in FIG. 5). It is efficient enough that structures can be computed on demand, which is critical for supporting ephemeral perception.

The end result of the system interpreting structure of the freeform graphic elements is that the data obtained will now be organized as at least one structured element. As noted above, these elements include lists, tables, outlines, text, and node-link diagrams. The significance of this interpretation of particular structure is that, as will be described below, the structure dictates the manner in which the elements are navigated during transcription and edited during editing.

Referring back now to FIG. 4, after structure is interpreted, a freeform graphic element, a set thereof, or a surrogate element (described below) is then selected (step 108) and a determination is made whether to edit that selection (step 110). If so, editing functions are performed on the structure (step 112). In this regard, the structure, e.g. lists, lists with sublists, two-dimensional tables or arrays, etc. can be altered in the text domain using a keyboard, mouse, pen, or a combination of such items. Operations that can be accomplished are selection, moving, removing, and changing.

More particularly, selection can be accomplished with a mouse, keyboard or pen. There are three kinds of selection: initial, hierarchical, and sequential. When there is no current selections, a FGE is initially selected by pointing with the mouse at it on the display. Once there is a selection, it can be expanded by a hierarchical selection by using the Expand command. (This command can be triggered in many ways; one way is to repeatedly clicking the mouse button while pointing in the same place.) The hierarchical selection changes the selection. Hierarchical selection in a one-dimensional list would simply alternate between the list item and the entire list. In a two-dimensional table, hierarchical selection could go from the item to the row in which the item is contained, then to the column in which the item is contained, and finally to the entire table. It would then cycle back to the item. Also, the selection can be changed sequentially by using the Next commands to select the next or previous elements in a structure. For example, if a word is selected, Next selects the adjacent word; if a cell in a table is selected, Next selects an adjacent cell. The different Next commands specify which direction to find the adjacent element. (The Next commands can be triggered in many ways; one way is to use the arrow keys on the keyboard to select the next element in the structure in the direction of the arrow.) In a list or one-dimensional table, sequential selection proceeds with the Next command selecting the items of the list one at a time in sequential order. This manner of navigating could also be applied to the transcription mode described below.

Once elements are selected, they are easily moved or altered. Consider a 2-dimensional table. Suppose the third column of the table is selected. The third column can be moved by simply dragging it with the mouse to the position desired. Then the columns reformat to accommodate the new position of the column.

It should be appreciated that there are many user inputs for specifying an edit, such as the column move. Using a keyboard command language, typing a command such as 2 ENTER would cause the selected column to move two columns to the right, and a command such as −2 ENTER would cause it to move two columns to the left. Using a mouse or pen input device, there are many more command techniques. For example, a selected column could be moved by the following techniques:

Clicking on an element E in another column. This would place the selected column to the right or left of the column containing E, depending on whether this column is to the right or left of the selected column.

Clicking in the space between two columns. This would move the selected column into this space.

Drawing an arc from the selected column to a position between two columns.

Performing operations on a surrogate object (described below).

A surrogate object is an abstract representation of the recognized structure among the FGE(s). Thus, one effective use of surrogates is to show the user the underlying geometric structure that the system has recognized among the FGE(s). That is, a surrogate element, or surrogate, is a graphical object that represents a structure or template, i.e., a graphical object representing the underlying geometrical structure of the FGE(s) or of a textual transcription of the FGE(s), and which can be used to effect editing operations both on the structure and on the FGE(s) themselves. For a 2-dimensional table, a surrogate may be a rectangular arrangement of square wire frames representing the elements of the table, selected elements being indicated by shading in the wire frames.

Surrogates are particularly useful for editing large objects that can't be displayed fully on the screen. More specifically, the use of surrogate elements will allow for improved editing capabilities if, for example, the user desires to move a column on a table that is too large to view on the screen. In this case, the surrogate element may be displayed on a pull-down or split screen, or a separate window on the display, to make the revision to the table.

Figure 6:
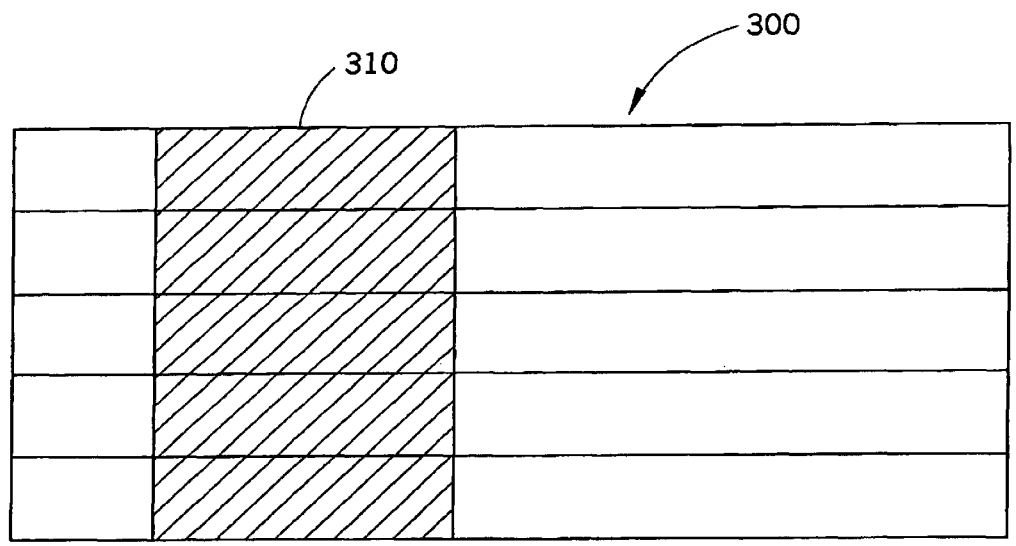
FIG. 6 is an illustration of a surrogate element according to the present invention.

To illustrate, if the data shown in FIG. 1 was too expansive to fit on the display and was considered to be a table by the system, the surrogate element would take the form of the element 300 shown in FIG. 6 and be displayed for editing. In FIG. 6, the second column 310 is shown as highlighted (hatching). The column 310 corresponds to the names (Jane, Tim, Angie, Bob and Larry) column and may be moved on the surrogate element 300. This would result in the actual display shown in FIG. 1 being changed accordingly.

Elements can be removed or duplicated after selection. For example, to delete the selected column, one technique would be to simply press the DELETE key.

Another use of the surrogate objects is to make it easy for the user to alter the underlying structure. For example, the table structure in FIG. 6 could be converted into a simple list by deleting the two middle vertical lines in the surrogate representation.

Text objects can be easily associated with structure. For example, a text header or caption can be added, either above or below a list, table or scribble object. This is a particular example of merging two structured objects. Once two objects have been merged, the selection hierarchy automatically would go up one level to the merged set.

Simple graphical elements can be inserted quickly and with little effort or complications. For example, a box can be inserted around a selected list or table. Or, a line can be inserted above or below an object. Lines can be inserted between individual rows or columns of a table, or between all rows or columns (or both) of a table.

It would also be useful to have a structured editor on the back end of the system for producing documents with better control of font and layout, and also for cleaning up any hand drawings. Because this level of presentation control is useful in some situations, it is important to be able to export the SFE representation into such a structured editor. Exporting is very simple, and as automatic as possible, with defaults for fonts and layout details of lists, tables, and header/captions.

It should also be recognized that a variety of editing techniques are described in the above referenced applications (U.S. Ser. Nos. 08/736,883 and 08/976,907) that are incorporated herein by reference. These techniques may also be applied to the present invention in suitable circumstances.

Referring back to FIG. 4, whether or not the selected freeform graphic element (or set or surrogate) is edited, a determination is subsequently made whether transcription should be accomplished in that selection (step 114). If, at step 110, the structure is not edited, then the method is advanced directly to step 114. At step 114, if it is determined that no transcription should be performed on the freeform graphic element, the method is advanced to step 124 where it is determined whether another element should be accessed.

If it is determined that a freeform graphic element(s) should be transcribed, the user navigates to a position within the interpreted structure of the element (step 116). The freeform graphic element is then transcribed (step 120). Transcription can be done automatically by handwriting recognition algorithms or manually by the user inputting the transcription or a mixture of both automatic and manual techniques.

It is to be appreciated that automatic recognition algorithms are well known. The automatic recognition here would be under control of the user (e.g., select a list and apply automatic recognition just to the list). Since these automatic recognition techniques are not perfect, the user would have to correct the errors, so the process would not be totally automated.

With reference now to FIG. 7, a page 400 with several scribbled lists of words (each list 410 is vertically arranged, and the set of lists 420 are horizontally arranged) is shown. To manually transcribe this, the user simply points to some scribbled word (say the upper left word "CAT") and starts typing. The inserted characters (in editable text format) overwrite the scribbles. When the user triggers the Next-down command, the cursor jumps to the next scribbled word "DOG" in the list. If the user then triggers the Next-right command, then it jumps to the word to the right "bat". During this process, there is a mix of text and scribbles. The user can transcribe all the scribbles into text, resulting in pure text, or just some of them, resulting in a mix.

Other "modes" of transcription are possible and are optionally implemented. The text could be positioned next to the corresponding scribbles, as shown in FIG. 8, so that both are seen. The text could overlay the scribbles, and controls provided to make either the scribbles or text be more visible. This is illustrated in FIG. 9 (where the scribble is shown in a less visible state) and represents a preferred mode of operation. There could be a split screen, with scribbles in one buffer and the text in the other. As text is typed, the text buffer is structured in correspondence with the structure of the scribbles. A simple algorithm is used to automatically scroll the scribble buffer as text is input, so that it is not necessary to move attention back to the scribble buffer for scrolling. It should be appreciated that these transcription techniques could also be applied to clean-up characters that result from Optical Character Recognition (OCR), not simply scribbles.

With respect to navigation (which is implemented using the keyboard, a mouse, or a pen and suitable coding), the system determines patterns of navigation through the structure elements based on the structure imposed upon the data. For example, navigation through a list differs from navigation through a table or an outline. The hierarchy involved in such navigation and the coding for commands to navigate are predetermined but may take a variety of forms. In addition, navigation may also be accomplished in a surrogate element (or among such elements) in appropriate circumstances.

The key idea is that the structure that has been interpreted among the FGE(s) is automatically transferred to the text domain. It can be used to structure and aid the transcription, as well as to edit and augment the transcription.

Note that the text transcription doesn't have to be "literal." Suppose there is a scribbled matrix, with rows of options and columns of criteria. Each cell of the matrix represents the evaluation of an option against a criterion. Suppose the user only had scribbled "+" or "−" in each cell, but that there was much discussion about each of these evaluations. The text transcription could then summarize each evaluation as a sentence. But the structural template of the scribbles (i.e. the matrix structure) is used to provide a structure for the transcribed sentences, each sentence wrapping across short lines to form a cell shape, resulting in a tabular structure corresponding to the scribbled matrix. Alternatively, the text transcription of the discussion associated with the "+" or "−" may take the form of a footnote that can exist in the displayed structure as a footnote or be expanded to display the content of the footnote.

Drawings must be handled differently. There are two options. The simplest method is not to transcribe the FGE(s) representing drawings. When transcriptions are being displayed, these untranscribed FGE(s) can be either invisible or visible, depending on what the user wants. When data is exported from the SFE, the untranscribed FGE(e) can either be ignored or exported as graphic images along with the text transcriptions. Another method is to apply some automatic cleanup, representing strokes with straight lines, nearly horizontal strokes with horizontal lines, etc. Cleanup can always be done later, in the same editor or in a different editor. For example, the transcribed output from this SFE can be imported by a structured editor with manual drawing cleanup.

The important considerations for drawing cleanup are:
scribble insertion with or without literal representation
immediate drawing cleanup or deferred drawing cleanup
drawing cleanup in the transcription editor or in another editor
drawing cleanup with automatic, manual or combined means These methods are not limited to structure inferred from a scribble buffer. The SFE can have its own table entry mode, where the number of rows and columns are first entered and then the entries are filled up.

After transcription in any of the above modes, referring back now to FIG. 4, a determination is then made whether to navigate to another position (step 122), if so, steps 116–122 are repeated. If it is determined that there should be no navigation to another position, the determination is then made whether another selection should be made (step 124). If the decision is made to select again, steps 108–124 are repeated. If not, the data processed is exported to structured editors as described above (step 126). The method is then terminated (step 128).

It is to be appreciated that the above method may take various forms, including the selective incorporation of the transcription or editing modes. It may well be that it is not desired to transcribe scribble data. It is also possible that an application may not require editing features such as those described herein. In such cases, one or the other of the editing and transcribing modes can be deleted.

The above description merely provides a disclosure of particular embodiments of the invention. It is not intended for the purpose of limiting the same thereto. As such, the invention is not limited to only the above described embodiments. Rather, it is recognized that one skilled in the art could conceive alternative embodiments that fall within the scope of the invention.

Having thus described the invention, we hereby claim:

1. A computer implemented method for use with a device that stores free freeform data, comprising:
   importing the data from the device;
   segmenting the data into freeform graphic elements;
   interpreting a structure of the freeform graphic elements;
   generating a surrogate element based on the structure;
   selectively editing the structure; and
   selectively transcribing the freeform graphic elements into an editable text format.

2. The method as set forth in claim 2 wherein the selective editing includes editing the surrogate element.

3. A computer implemented method for use with a device that stores free freeform data including scribble elements and text, the method comprising:
   importing the data from the device;
   segmenting the data into freeform graphic elements;
   interpreting a structure of the freeform graphic elements;
   generating a surrogate element based on the structure; and
   selectively editing the structure.

4. The method as set forth in claim 3 wherein the selective editing includes editing the surrogate element.

5. A computer system for use with a device that stores free freeform data including scribble elements and text, the system comprising:
   means for importing the data from the device;
   means for segmenting the data into freeform graphic elements;
   means for interpreting a structure of the freeform graphic elements;
   means for generating a surrogate element based on the structure;
   means for selectively editing the structure; and
   means for selectively transcribing the freeform graphic elements into an editable text format.

6. The system as set forth in claim 5 further comprising means for editing the surrogate element.

* * * * *